United States Patent
Aarons et al.

(10) Patent No.: US 7,847,924 B2
(45) Date of Patent: Dec. 7, 2010

(54) PERFORMANCE OF AN ATOM INTERFEROMETRIC DEVICE THROUGH COMPLEMENTARY FILTERING

(75) Inventors: Robert L. Aarons, Brooklyn, NY (US); Walter K. Feldman, Smithtown, NY (US); Hugh F. Rice, New Rochelle, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 126 days.

(21) Appl. No.: 12/337,331

(22) Filed: Dec. 17, 2008

(65) Prior Publication Data

US 2010/0149541 A1 Jun. 17, 2010

(51) Int. Cl.
*G01P 3/36* (2006.01)
*G01B 11/02* (2006.01)

(52) U.S. Cl. ........................... 356/28.5; 356/498
(58) Field of Classification Search ............ 356/28.5, 356/496, 498
See application file for complete search history.

(56) References Cited

U.S. PATENT DOCUMENTS

| | | | | |
|---|---|---|---|---|
| 3,992,953 | A * | 11/1976 | Ljung et al. ............... | 73/514.19 |
| 5,532,565 | A * | 7/1996 | Vervoordeldonk ........... | 318/610 |
| 7,209,219 | B2 * | 4/2007 | Butler ........................... | 355/75 |
| 2002/0123857 | A1 * | 9/2002 | Bjorset, Sr. .................. | 702/151 |
| 2004/0176861 | A1 * | 9/2004 | Butler .......................... | 700/63 |
| 2007/0194982 | A1 * | 8/2007 | Stove .......................... | 342/174 |

OTHER PUBLICATIONS

Jekeli, Christopher, "Navigation Error Analysis of Atom Interferometer Inertial Sensor", "Navigation: Journal of The Institute of Navigation Spring 2005", , vol. 52, No. 1, Publisher: The Institute of Navigation, Inc., Published in: US.

* cited by examiner

*Primary Examiner*—Patrick J Connolly
(74) *Attorney, Agent, or Firm*—DeMont & Breyer, LLC

(57) ABSTRACT

A technique is disclosed which offers an improvement in the performance of an atom interferometric (AI) sensor, such as one that is used in an accelerometer or a gyroscope. The improvement is based on the recognition that the AI-based device, which is associated with superior low-frequency performance, can be augmented with a conventional device having a superior high-frequency performance, as well as a wider frequency response, compared with that of the AI-based device. The disclosed technique combines acceleration measurements from the AI-based device, which is characterized by transfer function $G(s)$, with acceleration measurements from the conventional device that have been adjusted by a complementary function, $1-\hat{G}(s)$, where $\hat{G}(s)$ is an approximation of $G(s)$. The conventional device has a considerably wider bandwidth than that of the AI-based device, and the quasi-unity transfer function of the conventional device makes possible the $1-\hat{G}(s)$ adjustment of the measurements provided by the conventional device.

20 Claims, 7 Drawing Sheets

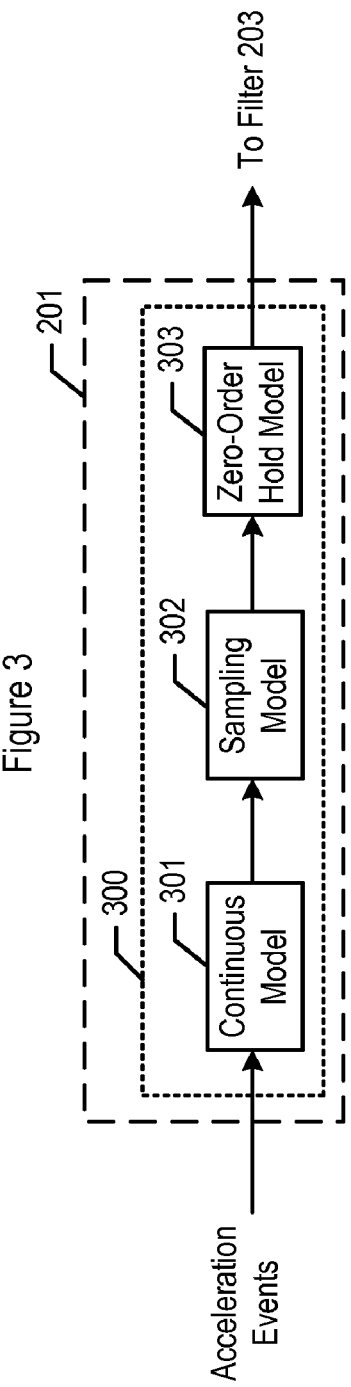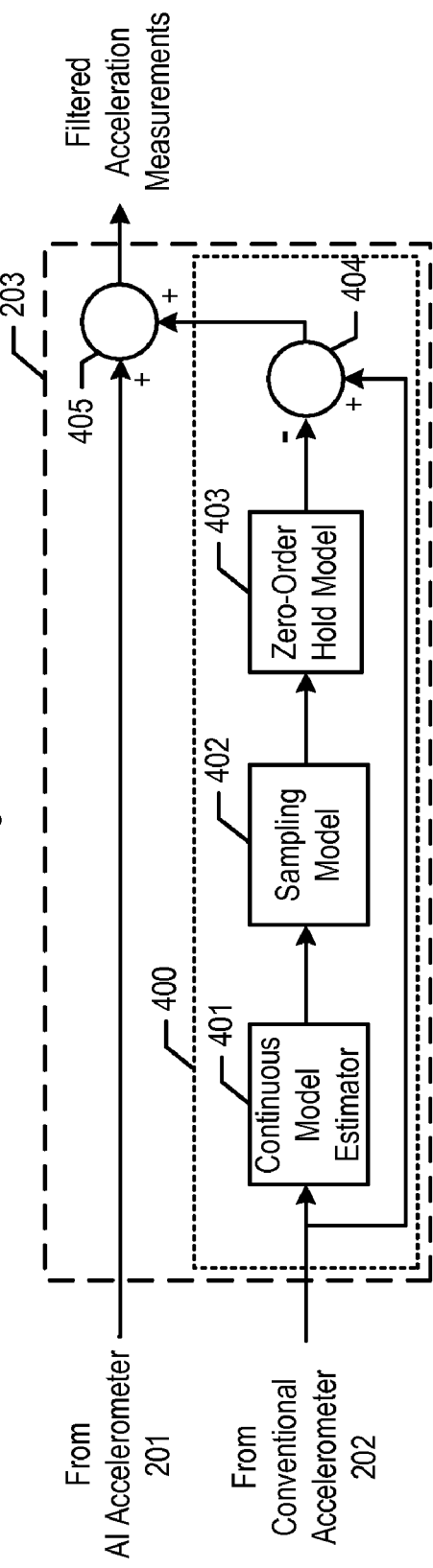

PERFORMANCE OF AN ATOM INTERFEROMETRIC DEVICE THROUGH COMPLEMENTARY FILTERING

FIELD OF THE INVENTION

The present invention relates to atom interferometric devices in general and, more particularly, to improving the performance of an atom interferometric device through complementary filtering.

BACKGROUND OF THE INVENTION

Atom interferometric-based (AI-based) devices apply the science of coherent atom-laser interactions to make sensitive and accurate measurements of the trajectories of ensembles of atoms, in order to determine acceleration. A classical analogy for the AI-based acceleration measurement is to consider measuring the trajectory of a proof mass in an accelerating reference frame. As depicted in FIG. 1 in the prior art, an atom-interferometric accelerometer essentially operates by replacing the relatively large proof mass with atoms. The atoms are situated in an entity known as an "atom cloud." The atom cloud is released—that is, dropped or launched—and effectively becomes a reference point in space. During the atom cloud's free fall, a measuring laser such as a Raman laser is used to measure the accelerometer's motion relative to the atom cloud. The measuring laser measures the atoms' trajectory through three successive interactions with laser beams, namely $\phi(t_1)$, $\phi(t_2)$, and $\phi(t_3)$, where the $\phi$-values are indicative of atom cloud displacement and $t_1$, $t_2$, and $t_3$ are the times at which these displacements are measured. The interactions are separated by interval $T_R$.

An AI-based accelerometer is advantageous for a variety of reasons. First, it provides precise inertial measurements, as they are based on the interference of atom waves. Second, the device has no moving parts, except for the atoms, thereby providing the potential for low-cost, low-maintenance sensors. Third, the atom densities in the coherent atom cloud provide the potential for high signal-to-noise ratios. And fourth, the use of an atomic proof mass ensures that the material properties between sensor proof masses will be identical.

Additionally, an atom interferometric accelerometer has the potential to exhibit superior low frequency performance over conventional accelerometers, which rely on larger proof masses to provide acceleration measurements.

SUMMARY OF THE INVENTION

Although an atom interferometric-based (AI-based) device has an advantage in low-frequency performance over a conventional device that is based on a relatively large proof mass, an AI device also has several disadvantages. First, an AI device has a low bandwidth because of a relatively long output sample time. Second, an AI device has a low output sample rate, which can cause output harmonics and aliasing when driven, for example, by a sinusoidal acceleration input. Third, an AI device is characterized by a zero-sensitivity frequency response that comprises notches at specific frequencies as determined by one or more processing parameters of the AI device, such as the Raman interval. And fourth, the time lag of when an accelerometer output sample becomes available is relatively long and, consequently, a group delay is introduced.

A technique is disclosed herein which offers an improvement in the performance of an atom interferometric (AI) sensor, such as one that is used in an accelerometer or a gyroscope, over some AI-based sensors in the prior art. The improvement is based on the recognition that the AI-based device, which is associated with superior low-frequency performance, can be augmented with a conventional device having superior high-frequency performance, as well as a wider frequency response, compared with that of the AI-based device. In accordance with the illustrative embodiment of the present invention, the disclosed technique combines acceleration measurements from the AI-based device, which is characterized by transfer function G(s), where s is a complex number, with acceleration measurements from the conventional device that have been adjusted by a complementary function, $1-\hat{G}(s)$, where $\hat{G}(s)$ is an approximation of G(s).

The complementary filtering of the illustrative embodiment provides an improvement over the prior art because the conventional device has a considerably wider bandwidth than that of the AI-based device. This quasi-unity transfer function of the conventional device makes possible the $1-\hat{G}(s)$ adjustment of the measurements provided by the conventional device. And when combined with sampled-and-held output from the AI device, the illustrative embodiment yields approximately true acceleration, including eliminating group delay and the errors due to notches in the AI device's frequency response.

The illustrative embodiment features an atom-interferometric accelerometer and a conventional accelerometer being used concurrently to measure acceleration. However, it will be clear to those skilled in the art, after reading this specification, how to make and use alternative embodiments in which measurements from another type of first accelerometer that features superior low-frequency performance can be complementary-filtered with measurements from another type of second accelerometer that features superior high-frequency performance and a wider frequency band than the first accelerometer. Also, it will be clear to those skilled in the art, after reading this specification, how to make and use alternative embodiments in which devices other than accelerometers are utilized, such as gyroscopes.

The illustrative embodiment of the present invention comprises a method comprising: sensing an acceleration at a first accelerometer and a second accelerometer, resulting in first measurement made by the first accelerometer and a second measurement made by the second accelerometer, the first measurement being affected by a transfer function that characterizes the first accelerometer; adjusting the second measurement with an approximation of the transfer function, resulting in an adjusted measurement; and generating a filtered acceleration measurement, based on i) the first measurement and ii) the adjusted measurement.

BRIEF DESCRIPTION OF THE DRAWINGS

FIG. 3 depicts a signal-processing model of atom interferometric accelerometer 201, which is part of system 200.

FIG. 4 depicts a signal-processing model of complementary filter 203, which is part of system 200.

DETAILED DESCRIPTION

Figure 2:
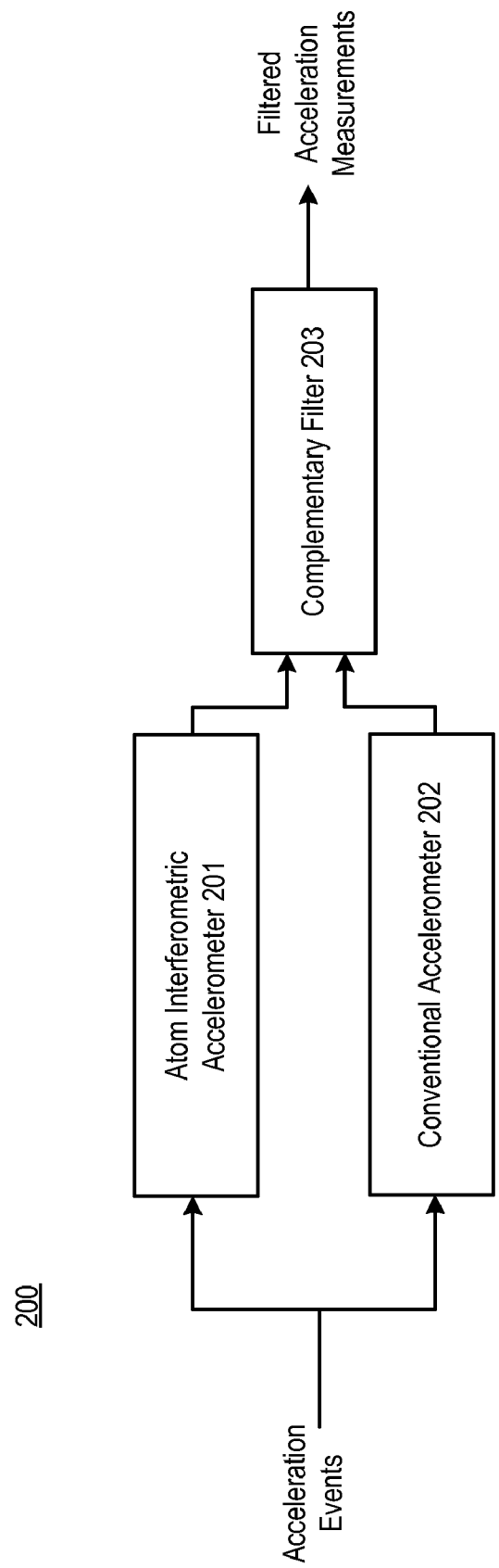
FIG. 2 depicts acceleration measuring system 200 in accordance with the illustrative embodiment of the present invention.

FIG. 2 depicts acceleration measuring system 200 in accordance with the illustrative embodiment of the present invention. System 200 comprises atom interferometric accelerometer 201, conventional accelerometer 202, and complementary filter 203, interconnected as shown. Although accelerometers are featured in the illustrative embodiment, it will be clear to those skilled in the art, after reading this specification, how to make and use alternative embodiments in which devices other than accelerometers are utilized, such as gyroscopes.

Figure 1:
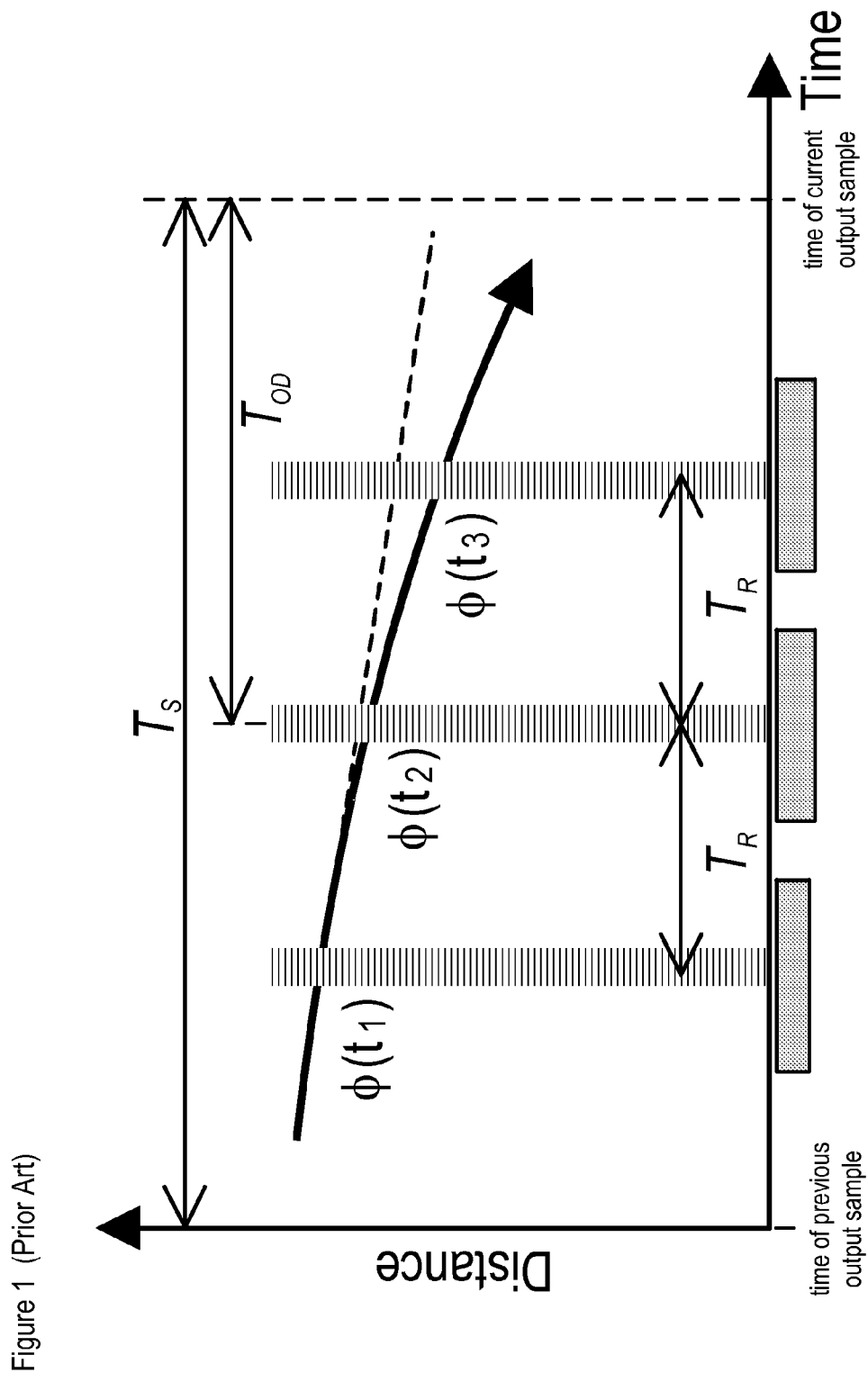
FIG. 1 depicts the operations of an atom interferometric accelerometer in the prior art.

Atom interferometric (AI) accelerometer 201 is a device that senses acceleration events through the use of atom interferometry, as is known in the art, and provides measurements of the sensed events. To do so, a measuring laser measures the trajectory of atoms in an atom cloud through three successive interactions with laser beams, as depicted in FIG. 1, in which the depicted φ-values are effectively indicative of atom cloud displacement and $t_1$, $t_2$, and $t_3$ are the times at which the displacements are measured. The interactions are separated by an interval $T_R$, which is also referred to as the Raman interval. The specific time at which the sensing of the acceleration by the atomic interferometer sensor is valid corresponds to the time of the middle interaction of the laser with the atom cloud (i.e., the second of the three Raman pulses). Accelerometer 201 makes available the acceleration measurement at an output time that is equal to the valid sensing time plus a delay $T_{OD}$. Delay $T_{OD}$, which is also referred to as "group delay," corresponds to the time difference between the output time and the valid sensing time. Each new acceleration measurement is provided by accelerometer 201 to complementary filter 203, at a sample interval $T_S$. In general, $T_S > T_{OD} > T_R$. These time-related parameters are further described below and with respect to FIG. 3, which depicts a signal-processing model of accelerometer 201.

In accordance with the illustrative embodiment, $T_S$, $T_{OD}$, and $T_R$ are equal to 10 seconds, 1.0 seconds, and 0.1 seconds, respectively. It will be clear to those who are skilled in the art, after reading this specification, how to make and use alternative embodiments in which one or more of $T_S$, $T_{OD}$, and $T_R$ can be equal to different values than those used in the illustrative embodiment. Furthermore, although the illustrative embodiment utilizes three Raman pulses per acceleration measurement with the same value for $T_R$ between each pulse, it will be clear to those who are skilled in the art, after reading this specification, how to make and use alternative embodiments in which the number of pulses is greater than three or the interval between adjacent pulses is different across the pulse pairs, or both.

It will be clear to those skilled in the art how to make and use AI accelerometer 201.

Conventional accelerometer 202 is a device that senses and provides measurements of the same acceleration events as does AI accelerometer 201, but through the use of a technique such as one that involves measuring the deflection of a much larger proof mass than an atom cloud and through non-laser means. Accelerometer 202 continually provides acceleration measurements to complementary filter 203, as does AI accelerometer 201. Because it is not constrained to using laser pulses, conventional accelerometer 202 is capable of providing acceleration measurements at a much higher sample rate than AI accelerometer 201 and at a much wider bandwidth. It is for this reason that the measurements from accelerometer 202, as they are used by filter 203, are assumed to be subject to a unity transfer function. However, as those who are skilled in the art will appreciate, in some alternative embodiments, the transfer function assumed for the measurements can be assumed to be different than unity, depending on the particular application to be optimized (e.g., seismic acceleration measurement, missile acceleration measurement, etc.). In any event, it will be clear to those skilled in the art how to make and use conventional accelerometer 202.

Complementary filter 203 is a data-processing system that receives accelerometer measurements from AI accelerometer 201 and conventional accelerometer 202, and provides filtered accelerometer measurements in accordance with the illustrative embodiment of the present invention. Filter 203 comprises a general-purpose processor or a special-purpose processor such as a digital signal processing device, or both. Filter 203 combines acceleration measurements from AI accelerometer 201, which is characterized by transfer function G(s), with acceleration measurements from conventional accelerometer 202 that have been adjusted by a complementary function, $1-\hat{G}(s)$, where $\hat{G}(s)$ is an approximation of G(s). This complementary filtering is further described below and with respect to FIG. 4, which depicts a signal-processing model of complementary filter 203. It will be clear to those skilled in the art, after reading this specification, how to make and use complementary filter 203.

FIG. 3 depicts a signal-processing model of atom interferometric accelerometer 201, in accordance with the illustrative embodiment of the present invention.

As described above, the signal processing of AI accelerometer 201 is characterized by transfer function G(s), which is represented by signal-processing model 300. Model 300 comprises AI continuous model 301, sampling model 302, and zero-order hold model 303, interrelated as shown.

Model 301 represents the "continuous" transfer function $H_{AI}(S)$ of the atom interferometric sensing that is utilized. As those who are skilled in the art will appreciate, for an illustrative AI accelerometer, $H_{AI}(S)$ is equal to:

$$H_{AI}(j\omega) = \frac{\sin^2(\omega T_R/2)}{(\omega T_R/2)^2} \cdot e^{-j\omega T_{OD}}, \quad \text{(Equation 1)}$$

where $T_R$ and $T_{OD}$ are as defined earlier. For frequency response, s=jω where ω is in radians per second.

Model 302 represents the sampling that occurs as part of the illustrative AI accelerometer processing, in which the sample rate is $T_S$ as defined earlier.

Model 303 represents the zero-order hold (ZOH) function that occurs as part of the AI accelerometer processing. As those who are skilled in the art will appreciate, the transfer function of the ZOH function is equal to:

$$ZOH(j\omega) = \left| T_S \cdot \frac{\sin(\omega T_S/2)}{(\omega T_S/2)} \right| \cdot e^{-j\left(\frac{\omega T_S}{2} + \alpha \cdot \pi\right)}, \quad \text{(Equation 2)}$$

where $T_S$ is the sample rate as defined earlier, α=0 if the expression within the absolute value operation is greater than or equal to zero, and α=1 if the same expression within the absolute value operation is less than zero.

FIG. 4 depicts a signal-processing model of complementary filter 203, in accordance with the illustrative embodiment of the present invention. In accordance with the illustrative embodiment, the sampling for the sampling model in FIG. 4 is synchronous with the sampling for the sample model in FIG. 3.

As described above, the signal processing of conventional accelerometer 202 is characterized by complementary function 1−Ĝ(s), where Ĝ(s) is an approximation of G(s), and where the complementary function is represented by signal-processing model 400. Model 400 comprises estimation function 401 of AI continuous model 301, sampling model 402, zero-order hold model 403, and difference function 404, interrelated as shown.

Model 401 represents the approximation $\hat{H}_{AI}(S)$ of continuous transfer function $H_{AI}(s)$, defined earlier.

Model 402 represents the sampling that occurs, in which the sample rate is also equal to $T_S$, as defined earlier. The sampling occurring at model 402 is synchronized with the sampling occurring at model 302.

Model 403 represents the zero-order hold (ZOH) function performed, in which the transfer function is also equal to ZOH(jω), as defined earlier.

Difference function 404 compares i) the output measurements from conventional accelerometer 202, to which output measurements an ideal wideband accelerometer (i.e., with a unity transfer function) is assumed to apply, to ii) those output measurements as adjusted by Ĝ(s). The transfer function Ĝ(s) represents the combined transfer functions of models 401 through 403.

The signal-processing model of complementary filter 203 further comprises adder function 405, which combines the measurements subject to model 300 with the complementary data produced by model 400, in accordance with the illustrative embodiment of the present invention. The resulting output from function 405 comprises filtered acceleration measurements.

FIGS. 5 through 8 depict flowcharts of the salient tasks as performed by system 200, in accordance with the illustrative embodiment of the present invention. As those who are skilled in the art will appreciate, in some alternative embodiments, only a subset of the depicted tasks is performed. In some other alternative embodiments, at least some of the tasks are performed simultaneously or in a different order from that depicted.

Figure 5:
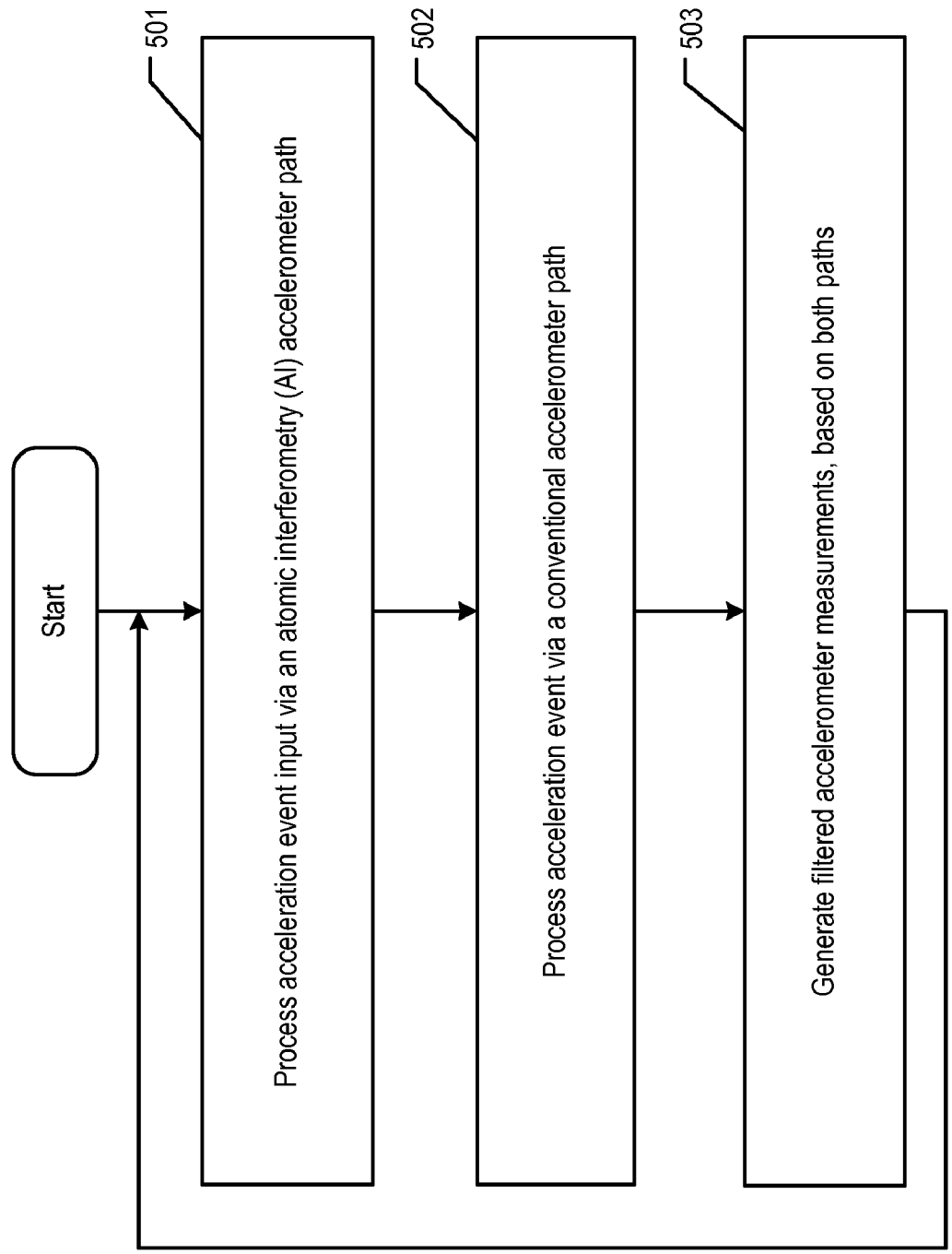
FIG. 5 depicts a flowchart of the main tasks performed by system 200, in accordance with the illustrative embodiment of the present invention.
Figure 6:
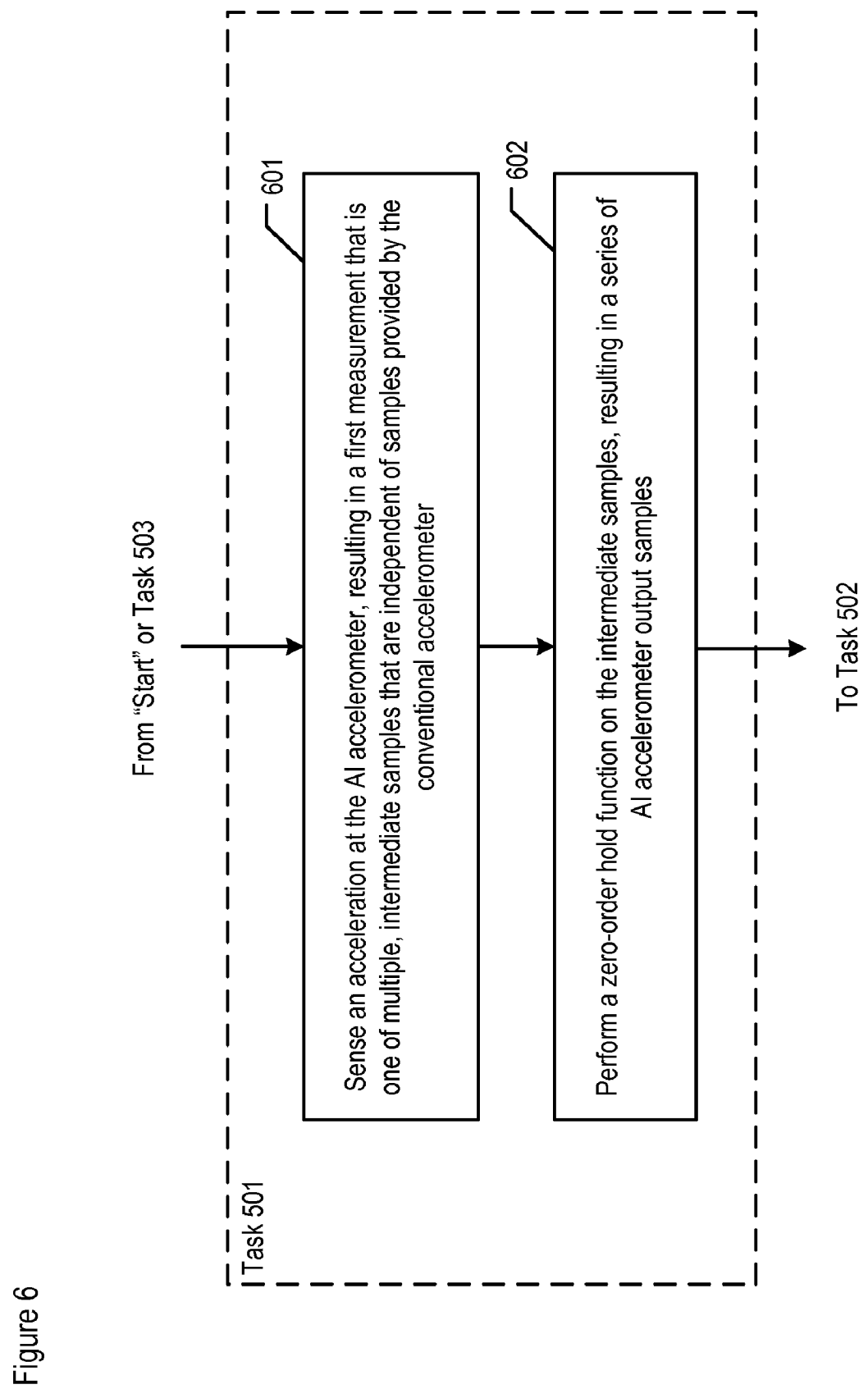
FIG. 6 depicts a flowchart of the salient subtasks associated with task 501 of FIG. 5.
Figure 7:
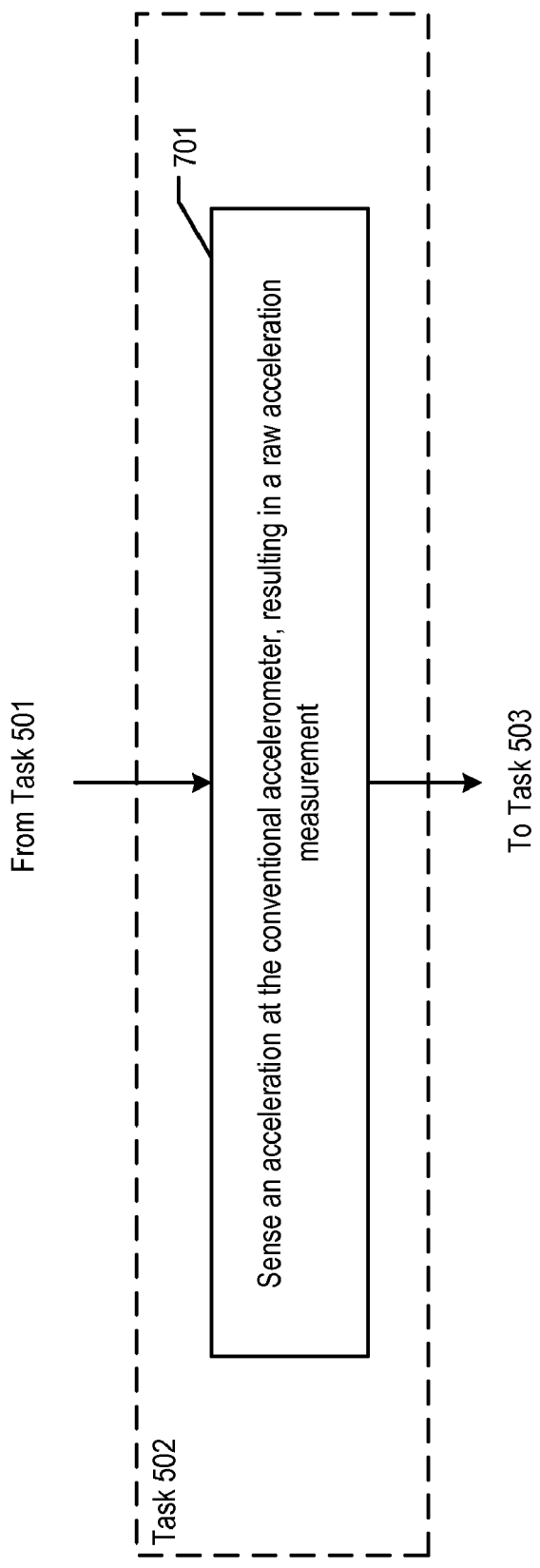
FIG. 7 depicts a flowchart of the salient subtasks associated with task 502 of FIG. 5.
Figure 8:
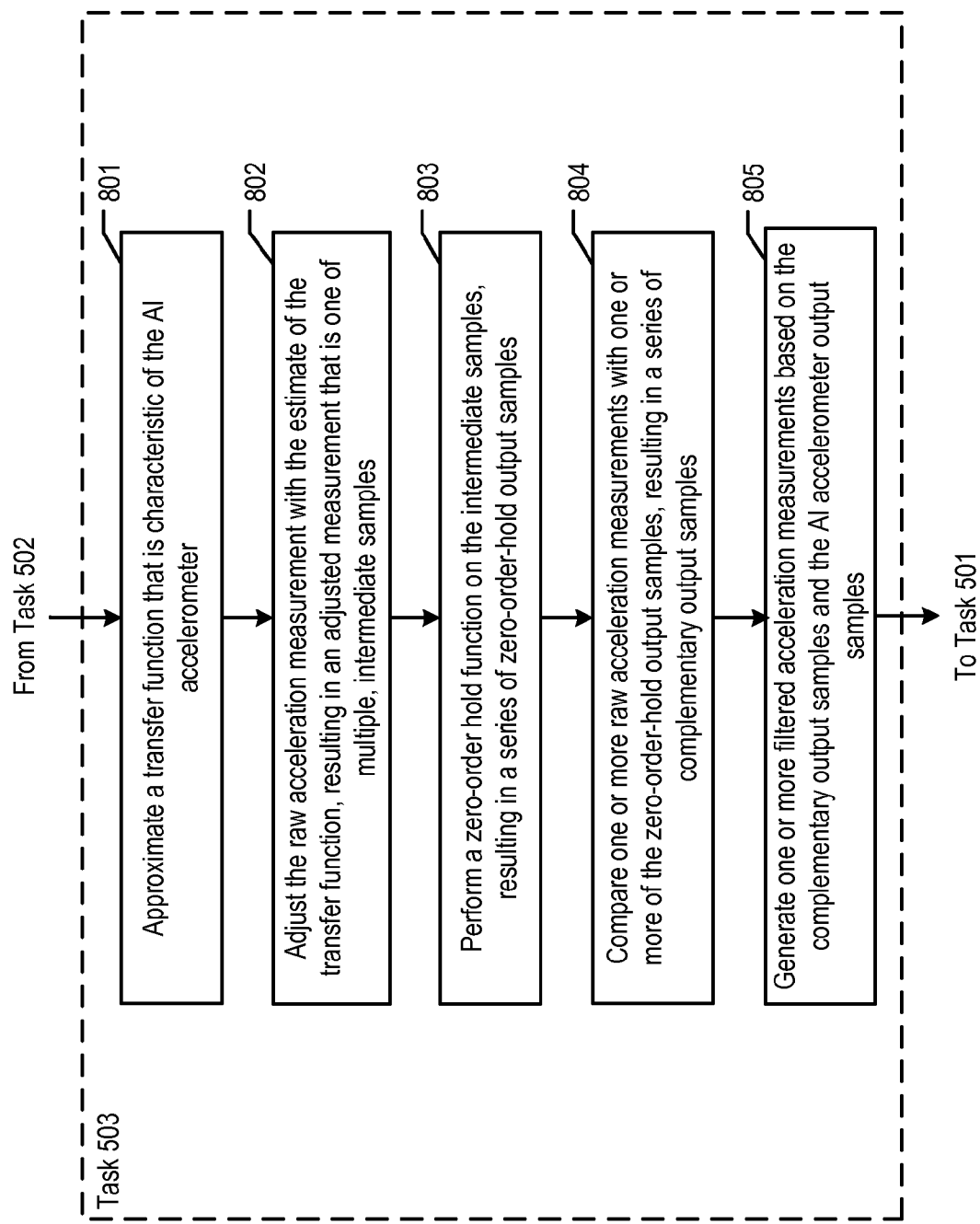
FIG. 8 depicts a flowchart of the salient subtasks associated with task 503 of FIG. 5.

In accordance with the illustrative embodiment, AI accelerometer 201 performs the subtasks that are associated with task 501 and with respect to FIG. 6, conventional accelerometer 202 performs the subtasks that are associated with task 502 and with respect to FIG. 7, and complementary filter 203 performs the subtasks that are associated with task 503 and with respect to FIG. 8. However, as those who are skilled in the art will appreciate, the performing of the tasks depicted in FIGS. 5 through 8 can be distributed among processing elements 201, 202, and 203 in a different way than described, or can involve another combination of processing elements entirely.

FIG. 5 depicts a flowchart of the main tasks performed by system 200, in accordance with the illustrative embodiment of the present invention. For pedagogical purposes, tasks 501, 502, and 503 are depicted as being performed in series by system 200. However, as those who are skilled in the art will appreciate, system 200 is able to perform two or more of the depicted tasks in parallel.

At task 501, system 200 processes an acceleration event input via AI accelerometer 201, in well-known fashion. The processing associated with task 501 is described in detail below and with respect to FIG. 6.

At task 502, system 200 processes the same acceleration event input via conventional accelerometer 202, in well-known fashion. The processing associated with task 502 is described in detail below and with respect to FIG. 7.

At task 503, system 200 generates filtered accelerometer measurements, based on the processing performed at tasks 501 and 502, in accordance with the illustrative embodiment of the present invention. The processing associated with task 503 is described in detail below and with respect to FIG. 8.

After task 503, task execution proceeds back to task 501, in which system 200 continues to process subsequent acceleration event inputs. For example, system 200 can process the subsequent events periodically, sporadically, or on demand.

FIG. 6 depicts a flowchart of the salient subtasks associated with task 501. At task 601, AI accelerometer 201 senses an acceleration event in well-known fashion, resulting in a measurement that is one of multiple, intermediate samples that are independent of measurements provided by conventional accelerometer 202.

At task 602, AI accelerometer 201 performs a zero-order hold function on the intermediate samples, in well-known fashion. The zero-order hold function results in a series of AI accelerometer output samples.

FIG. 7 depicts a flowchart of the salient subtask associated with task 502. At task 701, conventional accelerometer 202 senses an acceleration event in well-known fashion, resulting in a raw measurement. The raw measurement is one of multiple samples provided by accelerometer 202.

FIG. 8 depicts a flowchart of the salient subtasks associated with task 503. At task 801, complementary filter 203 approximates a transfer function $H_{AI}(S)$ that is characteristic of AI accelerometer 201, resulting in the approximation $\hat{H}_{AI}(S)$.

At task 802, filter 203 adjusts the raw acceleration measurements produced by conventional accelerometer 202, with the approximation of the transfer function obtained at task 801. This results in adjusted measurements that constitute a series of intermediate samples.

At task 803, filter 203 performs a zero-order hold function, with transfer function ZOH(jω), on the intermediate samples. This results in a series of zero-order hold output samples.

At task 804, filter 203 compares one or more raw acceleration measurements received from conventional accelerometer 202 to which a unity function is applied, with one or more of the output samples provided at task 803. The comparison, which is a difference calculation, results in a series of complementary output samples.

At task 805, filter 203 generates one or more filtered acceleration measurements based on i) the complementary output samples provided at task 804 and ii) the output samples from AI accelerometer 201. In accordance with the illustrative embodiment, filter 203 generates the filtered measurements based on adding the complementary output samples and the AI accelerometer output samples together.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
sensing an acceleration at a first accelerometer and a second accelerometer, resulting in first measurement made by the first accelerometer and a second measurement made by the second accelerometer, the first measurement being affected by a transfer function that characterizes the first accelerometer;

adjusting the second measurement with an approximation of the transfer function, resulting in an adjusted measurement; and generating a filtered acceleration measurement, based on i) the first measurement and ii) the adjusted measurement.

2. The method of claim 1 wherein the first accelerometer comprises an atomic interferometer sensor, and wherein the transfer function characterizes the atomic interferometer sensor.

3. The method of claim 2 wherein the approximation of the transfer function is based on a time spacing $T_R$ between two adjacent Raman beams that are used by the atomic interferometer sensor in providing the first measurement.

4. The method of claim 3 wherein the approximation of the transfer function is also based on an output delay $T_{OD}$ that corresponds to the difference between i) a time at which the sensing of the acceleration by the atomic interferometer sensor is valid and ii) a time at which the atomic interferometer sensor makes available the value of the first measurement.

5. The method of claim 3 wherein the atomic interferometer sensor produces a series of intermediate samples, wherein the series comprises the first measurement, and wherein the time period between consecutive samples is $T_S$.

6. The method of claim 5 further comprising performing a zero-order hold operation on the series of intermediate samples, wherein the filtered acceleration measurement is also based on the zero-order hold operation.

7. The method of claim 6 wherein the performing of the zero-order hold operation has the effect of adjusting the first measurement by a transfer function that is a function of $T_S$.

8. The method of claim 1 further comprising comparing i) a first data sample that is based on the second measurement and ii) a second data sample that is based on the adjusted measurement, wherein the filtered acceleration measurement is also based on the comparison.

9. The method of claim 1 wherein the second accelerometer is characterized as having a wider frequency bandwidth than the first accelerometer.

10. The method of claim 9 wherein the first accelerometer is characterized as having a better low-frequency response than the second accelerometer.

11. A method comprising:

sensing an acceleration at i) a first accelerometer that comprises an atomic interferometer sensor and ii) a second accelerometer, resulting in first measurement made by the first accelerometer and a second measurement made by the second accelerometer, the first measurement being affected by a transfer function that characterizes the atomic interferometer sensor;

adjusting the second measurement with an approximation of the transfer function, resulting in an adjusted measurement, the approximation of the transfer function being based on i) a time spacing $T_R$ between two adjacent Raman beams that are used by the atomic interferometer sensor in providing the first measurement and ii) an output delay $T_{OD}$ that corresponds to the difference between a) a time at which the sensing of the acceleration by the atomic interferometer sensor is valid and b) a time at which the atomic interferometer sensor makes available the value of the first measurement; and generating a filtered acceleration measurement, based on i) the first measurement and ii) the adjusted measurement.

12. The method of claim 11 wherein the atomic interferometer sensor produces a series of intermediate samples, wherein the series comprises the first measurement, and wherein the time period between consecutive samples is $T_S$.

13. The method of claim 12 further comprising performing a zero-order hold operation on the series of intermediate samples, wherein the filtered acceleration measurement is also based on the zero-order hold operation, wherein the performing of the zero-order hold operation has the effect of adjusting the first measurement by a transfer function that is a function of $T_S$.

14. The method of claim 11 further comprising comparing i) a first data sample that is based on the second measurement and ii) a second data sample that is based on the adjusted measurement, wherein the filtered acceleration measurement is also based on the comparison.

15. The method of claim 11 wherein the second accelerometer is characterized as having a wider frequency bandwidth than the first accelerometer, and wherein the first accelerometer is characterized as having a better low-frequency response than the second accelerometer.

16. A method comprising:

sensing an acceleration at a conventional accelerometer which utilizes a means for sensing the acceleration other than atomic interferometry, resulting in a raw acceleration measurement;

adjusting the raw acceleration measurement with an approximation of a transfer function that characterizes an atomic interferometer sensor, resulting in an adjusted measurement, the approximation of the transfer function being based on i) a time spacing $T_R$ between two adjacent Raman beams that are used by the atomic interferometer sensor in producing an independent measurement of the acceleration, the independent measurement being independent in relation to the raw measurement, and ii) an output delay $T_{OD}$ that corresponds to the difference between a) a time at which the independent measurement is valid and b) a time at which the atomic interferometer sensor makes available the independent measurement;

comparing i) a first data sample that is based on the raw acceleration measurement and ii) a second data sample that is based on the adjusted measurement; and generating a filtered acceleration measurement, based on i) the comparison and ii) a third data sample that is based on the independent measurement.

17. The method of claim 16 wherein the atomic interferometer sensor produces a first series of intermediate samples, wherein the first series comprises the independent measurement, and wherein the time period between consecutive samples in the first series is $T_S$.

18. The method of claim 17 further comprising performing a first zero-order hold operation on the first series of intermediate samples, wherein the filtered acceleration measurement is also dependent on the first zero-order hold operation, and wherein the performing of the first zero-order hold operation has the effect of adjusting the first measurement by a transfer function that is a function of $T_S$.

19. The method of claim 18 further comprising performing a second zero-order hold operation on a second series of intermediate samples that comprises the adjusted measurement, wherein the samples in the second series are synchronous with the samples in the first series, and wherein the second data sample is also dependent on the second zero-order hold operation.

20. The method of claim 16 wherein the second accelerometer is characterized as having a wider frequency bandwidth than the first accelerometer, and wherein the first accelerometer is characterized as having a better low-frequency response than the second accelerometer.

* * * * *